United States Patent
Somasundaram et al.

(10) Patent No.: US 10,152,404 B2
(45) Date of Patent: Dec. 11, 2018

(54) COLLABORATIVE DEBUGGING

(71) Applicant: VMware, Inc., Palo Alto, CA (US)

(72) Inventors: Vijay Somasundaram, Mountain View, CA (US); Sanath Kumar Manavarte, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 221 days.

(21) Appl. No.: 15/345,193

(22) Filed: Nov. 7, 2016

(65) Prior Publication Data

US 2018/0129584 A1  May 10, 2018

(51) Int. Cl.
*G06F 11/00* (2006.01)
*G06F 11/36* (2006.01)
*G06N 99/00* (2010.01)

(52) U.S. Cl.
CPC ........ *G06F 11/3664* (2013.01); *G06F 11/362* (2013.01); *G06N 99/005* (2013.01)

(58) Field of Classification Search
CPC ............................ G06F 11/3664; G06F 11/362
See application file for complete search history.

(56) References Cited

U.S. PATENT DOCUMENTS

| | | | | |
|---|---|---|---|---|
| 5,978,584 A * | 11/1999 | Nishibata | ............ | G06F 11/3664 703/23 |
| 6,240,529 B1 * | 5/2001 | Kato | ................... | G06F 11/3636 714/33 |
| 9,645,910 B1 * | 5/2017 | Kaila | .................. | G06F 11/3624 |
| 2011/0307871 A1 * | 12/2011 | Branda | ............... | G06F 11/3644 717/129 |

* cited by examiner

*Primary Examiner* — Bryce P Bonzo
*Assistant Examiner* — Katherine Lin
(74) *Attorney, Agent, or Firm* — Fish & Richardson P.C.

(57) ABSTRACT

Methods, systems, and apparatus, including computer programs encoded on a computer storage medium, for providing a framework for collaborative debugging. In one aspect, a method includes generating a session for an application executing on a remote debugging system and during the session, receiving one or more application inputs for the application from one or more remote users and providing outputs generated by the application for presentation to the one or more remote users. The method further includes receiving a request to restart the session from a particular remote user, in response to receiving the request to restart the session, resubmitting the one or more application inputs to the application to replicate an ending application state for the session, and providing, for presentation to the particular remote user, a restarted session for the application starting from the ending application state.

20 Claims, 4 Drawing Sheets

COLLABORATIVE DEBUGGING

FIELD

The present specification relates generally to debugging.

BACKGROUND

A wide range of applications and tools can be used to develop a feature or debug an issue. The wide range of applications can include command line shell applications that execute programs, provide control over operating systems and files, and permit scripting of a sequence of tasks for regular use. Additionally, web browsers may be used to intuitively interact with applications, generate reports, set up test clusters and perform other similar actions. As such, it may be beneficial to provide a framework that combines the benefits of command line shell applications with the benefits of browser specific applications.

SUMMARY

In some implementations, a method of collaborative debugging provides debugging sessions through a web-based console. The debugging session can be mutable, bookmarkable, sharable and savable. The debugging session can be associated with a uniform resource locator (URL), so that multiple users can access a shared debugging session simultaneously. As the debugging session is shared, a restarted debugging session is generated to be accessed and modified by each of the multiple users. In this instance, each of the restarted sessions are maintained by a separate container, so that the inputs of each user at each of the restarted sessions can be used to generate correspond output at the restarted sessions. Further, the inputs that are provided at each of the restarted sessions can be stored for future reference. As such, collaborative debugging can be performed in which multiple users collaborate across different platforms and locations to simultaneously monitor and contribute to a shared debugging session.

One innovative aspect of the subject matter described in this specification is embodied in methods that include the actions of generating a session for an application executing on a remote debugging system. The methods can also include during the session, receiving one or more application inputs for the application from one or more remote users and providing outputs generated by the application for presentation to the one or more remote users and receiving a request to restart the session from a particular remote user. Further, the methods can include in response to receiving the request to restart the session, resubmitting the one or more application inputs to the application to replicate an ending application state for the session and providing, for presentation to the particular remote user, a restarted session for the application starting from the ending application state.

Other implementations of this and other aspects include corresponding systems, apparatus, and computer programs, configured to perform the actions of the methods, encoded on computer storage devices.

Implementations may each optionally include one or more of the following features. For instance, generating the session can include executing the application in a container that is managed by the remote debugging system. The method can also include associating a unique identifier with the session, receiving a request from a remote user that includes the unique identifier, and in response to receiving the request, providing the remote user access to the session. In certain aspects, the method can include storing state data defining the ending application state for the session, and analyzing the state data for patterns using one or more machine learning systems. The method can further include receiving the one or more application inputs as an input stream over a web socket connection, and providing the one or more outputs generated by the application as an output stream over the web socket connection. In some aspects, the restarted session for the application is a stream that allows the particular remote user to interact with a command line interface for the application.

The method can also include during the restarted session, receiving one or more application inputs for the application from the particular remote user, and providing, for presentation to the particular remote user, outputs generated by the application for presentation to the remote user. In certain aspects, the application executing on the remote application session is a browser based application. In this instance, the browser based application can provide the particular remote user access to one or more of a debugging tool and an executable script. The method can also include, receiving a plurality of requests to restart the session from multiple remote users, in response to receiving the plurality of requests to restart the session, resubmitting the one or more application inputs to the application to replicate an ending application state for the session, wherein the plurality of requests are multiplexed at a web server layer, and providing, for presentation to each of the multiple remote users, a restarted session for the application starting from the ending application state, wherein the restarted session is demultiplexed at the web server layer.

Advantageous implementations can include one or more of the following features. Methods for collaborative debugging can provide shareable console processes in which application inputs of a debugging session can be saved for future reference. The application inputs can be used to store a context of the debugging session so that previous work is not lost. As such, the application inputs do not need to be replicated to reach the previous context of the debugging session. Collaborative debugging enables multiple users to collaborate in real time across various locations and devices. The collaborative debugging can include monitoring of a debugging session in real time as well as modification of the debugging session. The debugging session can be shared via links such as URLs that are bookmarkable, to be easily accessed for future use. The application inputs corresponding to a particular debugging session can be stored to be replayed in the future. Such application inputs can be used to restart a debugging session from a previous context of the debugging session. The application inputs can also be used to provide insight into how a particular application was effectively debugged. In this instance, the stored contexts of the debugging session can be utilized to analyze debugging trends and patterns as reference points for future debugging sessions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

This document generally describes techniques for collaborative debugging. A described technique includes generating a session for an application executing on a remote debugging system. During the session, one or more application inputs for the application can be received from one or more remote users. Outputs that are generated by the application can be provided for presentation to the one or more remote users. After the session has been ended or paused, a request to restart the session can be received from a particular remote user. In response to receiving the request to restart the session, the one or more application inputs can be resubmitted to the application to replicate an ending application state for the session. The restarted session for the application starting from the ending application state can be provided for presentation to the particular remote user.

Figure 1:
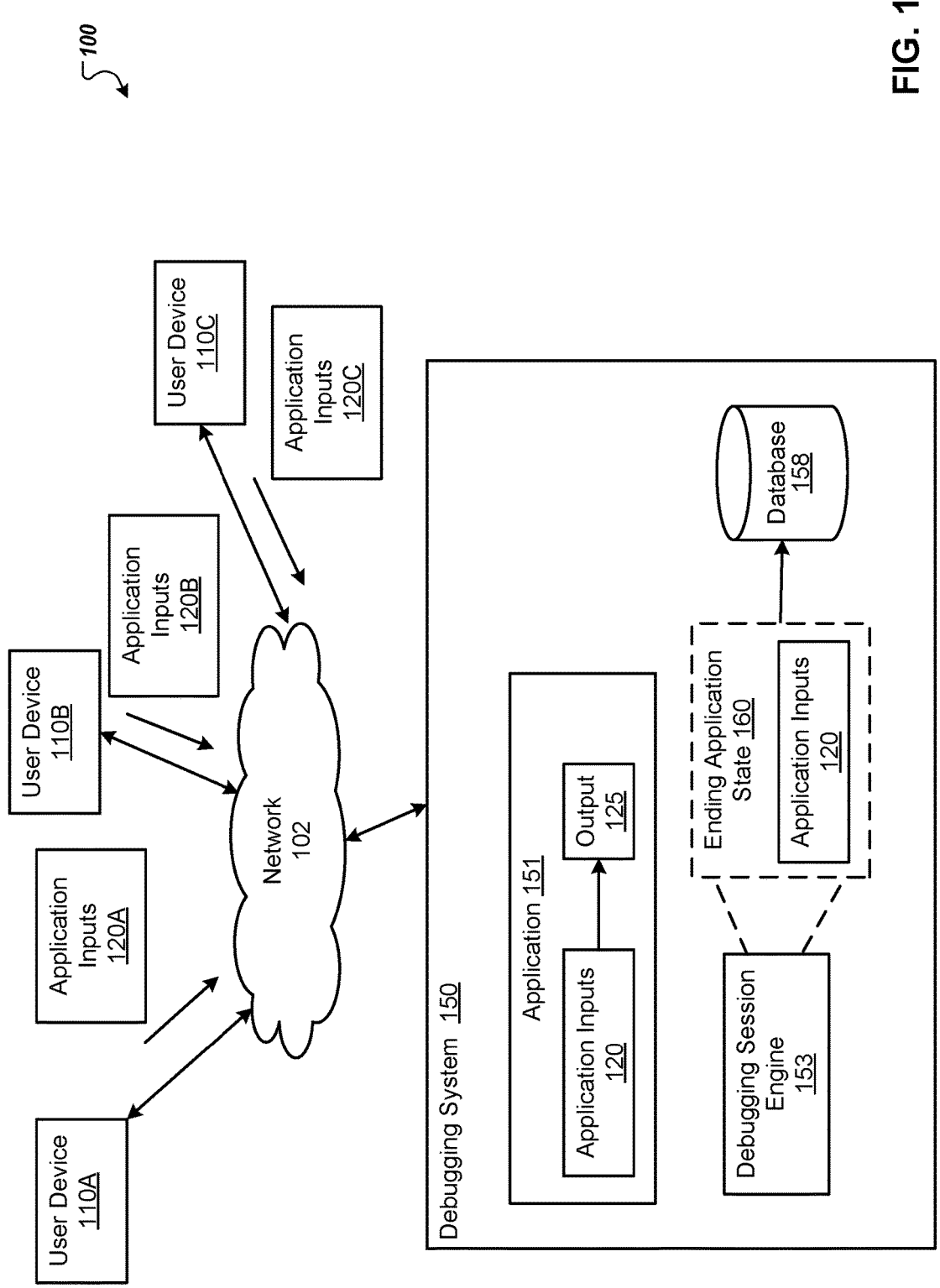
FIG. 1 illustrates an exemplary environment for collaborative debugging, according to certain aspects.

FIG. 1 is a diagram of an exemplary environment 100 for collaborative debugging, according to certain aspects. The environment 100 for collaborative debugging includes one or more user devices 110A, 110B, 110C and a debugging system 150 connected over a network 102.

The debugging system 150 is a system implemented on one or more computers in one or more locations that allows users of the user devices 110A-C to engage in debugging sessions to debug applications executed by the debugging system 150. Generally, during a debugging session, one or more users submit inputs to an executing application and observe the results of those inputs in an attempt to identify and, optionally, remove errors ("bugs") from the application.

The network 102 can include a local area network (LAN), a wide area network (WAN), e.g., the Internet, or any combination thereof. The network 102 connects the user devices 102A-C to the debugging system 150.

The debugging system 150 can include an application 151 to be debugged by the users of the user devices 102A-C, a debugging session engine 153 for providing debugging sessions during which users debug the application 151, and a database 158 for storing debugging session data generated by the debugging session engine 153.

In some cases, the application 151 is a browser-based application. In some aspects, the debugging system 150 can assist users in debugging by providing the user with access to a debugging tool running on the debugging system 150, an executable script running on the debugging system 150, or any combination thereof, during the debugging session.

Generally, during a debugging session, the debugging session engine 153 can receive application inputs 120 for the application 151, provide the inputs to the application 151, and provide output 125 generated by the application 151 as a result of the received application inputs 120 for presentation to the users participating in the debugging session. For example, an application input 120 can be a command to the application that is received through a command line interface. In another example, the application input 120 can be an event submitted through a user interface such as an activation action, a selection, or an entry of text in a text box.

The user devices 110A-C can include one or more electronic devices such as a computer, smartphone, tablet, laptop, and the like. During the debugging session, the user devices 110A-C can each send corresponding application inputs 120A, 120B, 120C intended for the application 151 to the debugging system 150 via the network 102.

The debugging session engine 153 can generate a debugging session at the debugging system 150. The debugging session can allow a user to interactively walk through and debug a subset of code. During the debugging session, a user can walk through the operations and output of the subset of code to identify any defects or errors within the subset. In some cases, once a defect has been identified within the subset, the user can modify the subset in an attempt to resolve the defects of the subset. The debugging session can be accessed by one or more remote users via the user devices 110A-C.

In some aspects, the debugging session engine 153 can associate the generated debugging session with a unique identifier such as a Uniform Resource Locator (URL). Specifically, the URL can be used to provide a link to the debugging session via a browser. For example, when accessed, the URL can establish a web socket connection to a web server. The web server can be used to create a debugging session, to be provided to the user who accessed the URL. As such, multiple remote users can access the debugging session via the unique identifier that is associated with the debugging session. In certain aspects, the debugging engine 153 can use a load balancer to establish the web socket connection between the browser and the web server. The debugging engine 153 can provide commands to the load balancer such as routing requests. The routing requests can include application inputs 120 or requests to start, or generate, the debugging session. The debugging engine 153 can stream the application inputs 120 from the browser to the debugging session in a container. As the debugging engine 153 processes the application inputs 120 generate corresponding outputs, the corresponding outputs can be streamed back from the debugging session to the browser for presentation.

The debugging session engine 153 can store application inputs 120 and, optionally, corresponding output 125 that are processed during the debugging session. The application inputs 120 can be stored as they are received by the debugging system 150. In some aspects, the application inputs 120 can be tracked by the debugging session engine 153. The corresponding output 125 can be stored as it is processed by the debugging session engine 153. In some aspects, the application inputs 120 and the corresponding output 125 can be stored at predetermined points in time. For example, the application inputs 120 and the corresponding output 125 can be stored every five seconds, every minute, every five minutes, and the like. The application inputs 120 and corresponding output 125 can be stored in a database 158. As such, the debugging session engine 153 can store the context of the debugging session. Thus, when modifications are made to a subset of code during a debugging session, the modifications can be compared to the previously stored contexts of the debugging session.

In certain aspects, the debugging session engine 153 can store an ending application state 160 of the application 151. The ending application state 160 can be determined when each user participating in the session explicitly ends a debugging session. In another example, the ending application state 160 can be determined when a debugging session is inactive for a predetermined period of time, such as one hour, twelve hours, three days, one week, a month, and the like. The ending application state 160 of the application 151 can include application inputs 120 and, optionally, corresponding output 125 that is processed during a debugging session. The application inputs 120 corresponding to an ending application state 160 can be stored in a database 158. Storing the application inputs 120 in the database 158 enables the debugging system 150 to store the ending application state 160 of a particular debugging session. As such, the debugging system 150 can save the ending application state 160 and the corresponding application inputs 120. Additionally, the debugging system 150 can share, bookmark, and fork the ending application state 160 and the corresponding application inputs 120.

In some aspects, the ending application state 160 and the corresponding application inputs 120 can be analyzed for patterns using one or more machine learning systems. By analyzing the ending application state 160 and the corresponding application inputs 120 for patterns, trends can be identified among debugging sessions to better address problems that are being debugged in future debugging sessions. For example, a particular pattern of application inputs 120 can be associated with a backtrace. The backtrace can be used as a digital signature to identify similar trends and steps in a debugging session. When a backtrace is identified, reports can be generated that correspond to other debugging sessions with a similar back trace and similar ending application state. The reports can include information corresponding to how the similar debugging sessions have progressed from the similar ending application state. Thus, a user can be provided with a report of potential avenues to proceed in debugging during a debugging session, due to previous, similar debugging sessions.

In another example, extraction can be used of the previously submitted application inputs. In other words, as the previous debugging sessions are analyzed, efficient application inputs can be determined from the previous debugging sessions that have been previously used to resolve a particular bug in a debugging session. Thus, as similar backtraces are identified, particular application inputs can be recommended according to the application inputs that have been determined to be most efficient in progressing from the ending application state 160 of the identified backtrace to a resolution of the debugging session.

After a debugging session has been ended or paused, the debugging session engine 153 can receive a request to restart a debugging session. In certain aspects, a restarted session can be restarted from the ending application state of the application 151. Thus, when a request to restart a debugging session is received, the debugging session engine 153 can resubmit the application inputs 120 to the application 151 to automatically replicate the ending application state 160 of a debugging session.

By saving the ending application state 160 of an application 151, the context of a debugging session may be stored. In saving the context of a debugging session, a user can switch between multiple issues and features when debugging. Additionally, saving the ending application state 160 of an application 151 allows multiple users to individually work on a debugging session without losing context information from previous tasks. Sharing the ending application state 160 of an application 151 permits multiple users to simultaneously contribute to and monitor a single debugging session. Further, storing the ending application state 160 of an application 151 enables a user to view previous application inputs 120 that were used to reach the ending application state 160. For example, the previous application inputs 120 can be compared to the corresponding output 125 of an application to determine how a particular debugging issue was resolved in the past. In another example, the stored ending application state 160 can enable users to stop debugging sessions, and resume the debugging sessions at a later point in time. In certain aspects, the debugging session can be initially accessed by a first device, and the debugging session can be resumed at a second device that is different from the first device. Thus, the context of the ending application state 160 can be used to improve debugging efficiency by maintaining the context of a debugging session among multiple users as well as across multiple devices.

Figure 2:
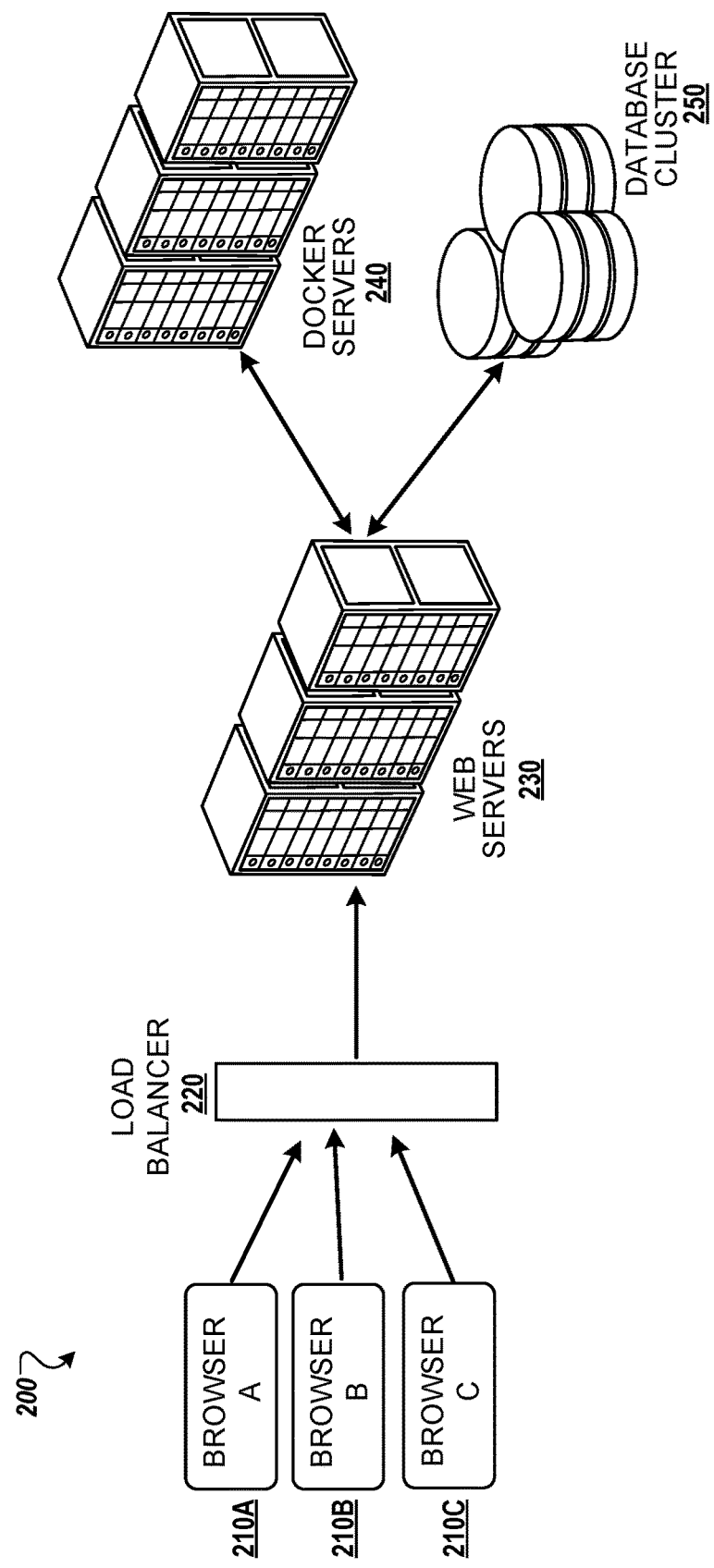
FIG. 2 illustrates an exemplary architecture for collaborative debugging, according to certain aspects.

FIG. 2 illustrates an exemplary architecture 200 for collaborative debugging, according to certain aspects. The architecture 200 for collaborative debugging includes one or more browsers 210A, 210B, 210C executed on the user devices 110A-C of FIG. 1, in addition to a load balancer 220, multiple web servers 230, multiple docker servers 240, and a database cluster 250, which are all parts of the debugging system 150 of FIG. 1.

In some aspects, the architecture 200 can also include load balancing via the load balancer 220, and process isolation and modularization via the docker servers 240. In certain aspects, the architecture 200 can further include an end user interface at one of the browsers 210, a virtual terminal at one of the browsers 210 which interacts with a running process on a docker server 240, a persistent URL for running the processes with a persistent output, and multi-user access to the same debugging session for collaboration via the persistent URL.

The load balancer 220 can be used to establish a web socket connection between the browsers 210 and the web servers 230. The load balancer 220 can route requests such as application inputs or requests to start debugging sessions from the browsers 210 to the web servers 230 via the web socket connection.

In certain aspects, the load balancer 230 can route the application inputs using a Round Robin policy. The implementation of a Round Robin policy implements a simple, starvation-free scheduling algorithm during collaborative debugging. For example, the Round Robin policy can be used to determine the process by which the application inputs are routed from the browsers 210 to the web servers 230. The Round Robin policy can employ time-sharing techniques in which the routing of each application input is associated with a particular time slot. If the routing of each application input is not completed within the particular time slot, the routing can be interrupted, and resumed at a later point in time when another time slot is assigned to that particular routing. In the Round Robin policy, the routing of each application input is considered equal and assigned a particular time slot in circular order. Thus, interrupted routings of application inputs may be passed over to be resumed at a later point in time when implementing the Round Robin policy.

The web servers 230 can deploy processes that enable debugging sessions to be created. In response to receiving a routed request from the load balancer 220, one of the web servers 230 can deploy a process within a software container in one of the docker servers 240. In some aspects, the web servers 230 can be setup in a Platform as a Service (PAAS) environment. In this instance, the web servers 230 can be managed while the infrastructure and middleware required to create and run the debugging sessions is maintained and/or built by an external entity. In some aspects, a debugging session can be created locally at a computing device such as a desktop, laptop, tablet, and the like. This local debugging session can be streamed to the web servers 230 via one of the browsers 210 and the load balancer 220. In this instance, the application inputs of the local debugging session can be streamed to the cloud and remote users may access the debugging session. As such, outputs corresponding to the application inputs can be streamed from the web servers 230 to the remote users for presentation. In certain aspects, the remote users can interact with the debugging session as it is streamed via one of the browsers 210.

For example, a local user can create a debugging session at a computing device. The local user may want to share the debugging session and thereby associate a URL with the debugging session. In this instance, the debugging session can be streamed to the cloud from the computing device of the local user, and the debugging session can be streamed from the cloud to multiple remote computing devices of multiple remote users. Thus, the debugging session can be shared with multiple remote users and accessed at multiple browsers 210 by the multiple remote users via the URL for collaborative purposes such as viewing, interaction, or any combination thereof.

The web servers 230 can run a background daemon that monitors the liveness of the docker servers 240, thereby routing requests from the load balancer 220 to different docker servers 240 based on such liveness. The background daemon run by the web servers 230 can be used to route requests from the load balancer 220 to the docker servers 240 based on load information and monitored states of each debugging session. For example, if a particular debugging session is identified to have crashed, the web servers 230 can automatically generate a new debugging session to replace the crashed session. In this instance, the web server 230 can access debugging session data stored in the database cluster 250 to generate a new session that replicates an ending state of the crashed debugging session.

The docker servers 240 can be used to facilitate the creation of software containers corresponding to the routed requests. The system can ultimately run an application to be debugged in one of the software containers. The software containers can further provide process isolation. In some aspects, the software containers provide process isolation that includes a faster startup time in comparison to virtual machines. In using docker servers 240 to maintain software containers outside of the browsers 210, the creator of a debugging session is not required to maintain the debugging session in order for other users to access the debugging session. Thus, by maintaining each debugging session outside the browser, multiple users can interact with the debugging session remotely and individually through an interface such as a web-based interface.

The database cluster 250 can include one or more databases for storing information pertaining to the debugging sessions. For example, the database cluster 250 can include session data, application data, host information, and authentication parameters. The session data can correspond to the context of a particular debugging session. The application data can correspond to information regarding the application that is being debugged. The database cluster 250 can be used to store application inputs to maintain previous states of an application. In saving the context of a debugging session, a user can switch between multiple issues and features when debugging. Further, by storing the context of a debugging session, other remote users can access the debugging session individually.

The database cluster 250 can be scaled individually without affecting the other layers involved in collaborative debugging. In particular, the database cluster 250 can be used to improve the speed, scalability, and robustness of storing data corresponding to the debugging sessions. The database cluster 250 can run a variety of storage engines, plugins, and other tools that promote versatility in storing information pertaining to collaborative debugging.

Each of the browsers 210A-C can be used to provide application inputs corresponding to a debugging session. The application inputs can be provided by the user, at one of the browsers 210. For example, an application input can include an input that is submitted to a particular application being debugged during the debugging session. The browsers 210A-C can further be used to request access to a previously created debugging session. The request can include a URL that is associated with the previously created debugging session. As the request for access, such as a URL, are provided at a browser 210, the browser 210 can transmit the application inputs to the load balancer 220 to create a restarted debugging session to be provided to the user.

The browsers 210 can include an end user interface through which functionality provided by the debugging session is accessed. The end user interface can be provided via a web user interface engine as well as a set of API's. In certain aspects, the user can interact via a pseudo-terminal interface at one of the browsers 210A-C. The pseudo-terminal interface can route application inputs to the web servers 230 via the load balancer 220, and can receive outputs corresponding to a debugging session. For example, outputs corresponding to the application inputs can be displayed at the browsers 210 via a Web Sockets feature of HTML5.

Figure 3:
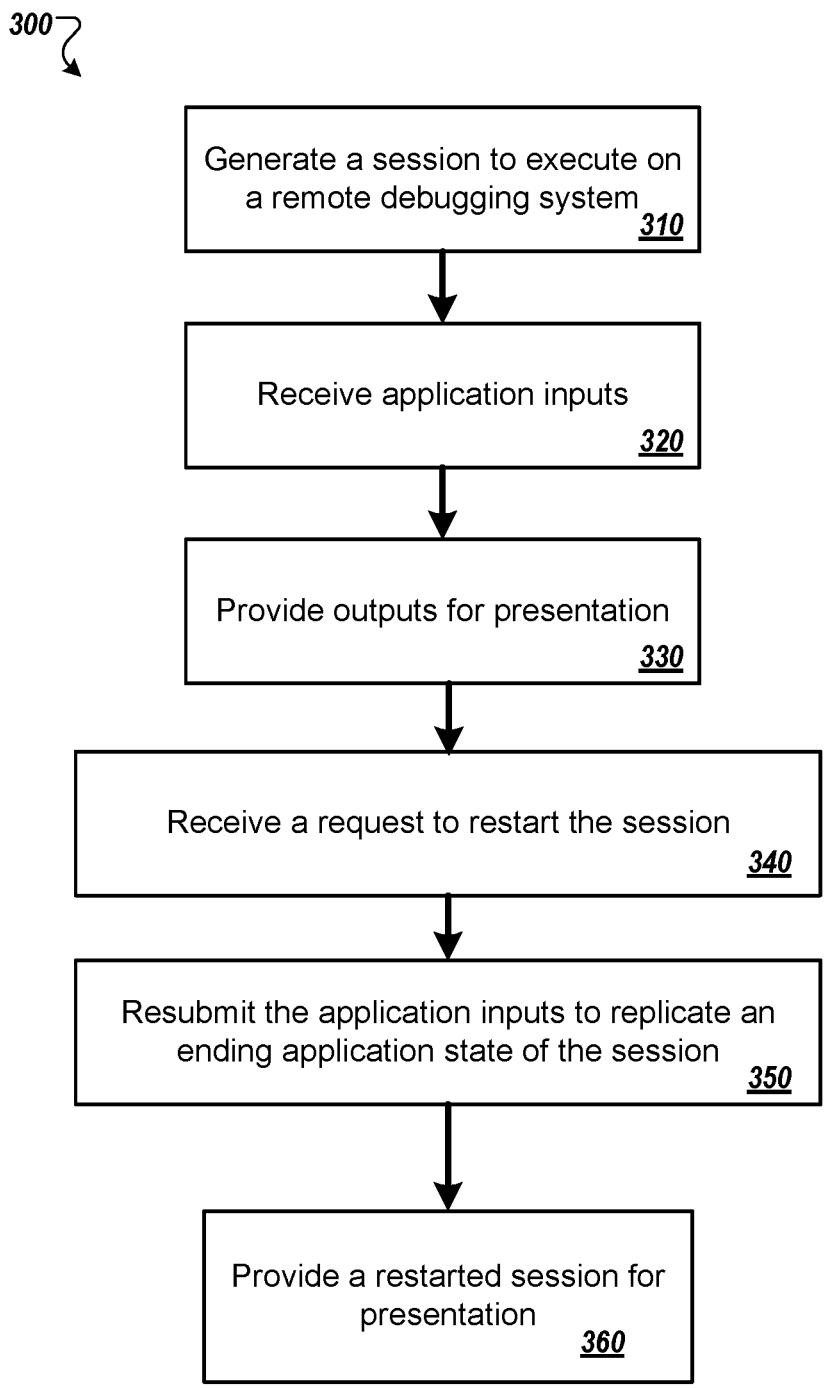
FIG. 3 is a flow diagram for an example process for restarting a debugging session, according to certain aspects.

FIG. 3 is a flow diagram for an example process 300 for restarting a debugging session. For convenience, the process 300 will be described as being performed by a system of one or more computers located in one or more locations. For example, a debugging system, e.g., the debugging system 150 of FIG. 1, appropriately programmed, can perform the process of 300. The process 300 for restarting a debugging session describes a process of maintaining a context of a debugging session and restarting the debugging session in which the context has been preserved.

At step 310, the application system generates a debugging session that is executed on a debugging system. The debugging session can correspond to an application that the debugging system executes. In certain aspects, the application is executed in a software container that is managed by the debugging system. The debugging system can include a docker server. The debugging session can be associated with a unique identifier. For example, the debugging system can generate the debugging session and a particular URL to be associated with the debugging session. Specifically, the URL can be used to provide a link to the debugging session. For example, when accessed, the URL can establish a web socket connection to a web server of the debugging system. The web server can be used to create a debugging session, to be provided to the user who accessed the URL. In certain aspects, the application executing on the application session can be a browser based application.

At step 320, the debugging system receives application inputs during the debugging session. The application inputs can be provided by one or more users. The users can provide the application inputs via a browser based application including a pseudo-terminal interface. The pseudo-terminal interface can include a command line interface corresponding to the application. Each application input can be routed by a corresponding browser of the particular user through a load balancer to the debugging system. In some aspects, the application inputs can include a request from a user that includes a unique identifier corresponding to the debugging session, such as a URL. The debugging system can receive the application inputs as an input stream over a web socket connection. The debugging system can persistently store the application inputs via a database cluster. As such, the context of each debugging session can be referred to at a later point in time due to the storage of the application inputs. In other words, by storing the application inputs corresponding to a particular debugging session, the debugging system can automatically achieve a previous state of the debugging session by resubmitting previously submitted application inputs.

At step 330, the debugging system receives outputs generated by the application as a result of the application inputs and provides the outputs for presentation to one or more users. The outputs can be presented to the users via the browser based application. In certain aspects, the outputs can be provided by the debugging system as an output stream over a web socket connection.

At step 340, the debugging system receives a request to restart the debugging session. For example, in the instance where the ending application state of a debugging session is saved, the debugging session may be resumed at a later point in time. The debugging system can receive the request to restart the debugging session even though the debugging session has ended. As such, one or more users who did not initially create the debugging session, can access the debugging session even if the initial user has killed the debugging session. Thus, the initial debugging session does not need to be maintained by the original user for other users to access the debugging session provided by the debugging system.

At step 350, the debugging system resubmits the application inputs to replicate an ending application state of the debugging session. The application inputs can be accessed via a debugging session that is currently running. For example, the application inputs can be accessed via a debugging session that is paused in a container. In this instance, the debugging session can be resumed when a restarted session corresponding to the debugging session is requested. Thus, the application inputs do not need to be resubmitted as the debugging session can be resumed and accessed from the paused state. In some aspects, the application inputs can be accessed at a database cluster in the instance where the debugging session has been killed. The application inputs can be resubmitted by the debugging system so that the corresponding outputs are reproduced. As the debugging system resubmits the application inputs to reproduce the corresponding outputs, the context of the debugging session can ultimately be provided to each of the users that requested the debugging session to be restarted.

At step 360, the debugging system provides the restarted session for presentation to one or more users. The restarted session can include an ending application state of the debugging session. Thus, the initial debugging session can be shared among multiple users by the debugging system. In this instance, the initial user does not need to maintain the initial debugging session. Further, each of the users can individually interact with the separately restarted debugging sessions. As such, the users can provide further application inputs to the restarted debugging sessions of the debugging system. By providing further application inputs to the restarted debugging sessions, the users can individually proceed in debugging a given application that is run at the debugging system without altering the context of the initial debugging session.

Figure 4:
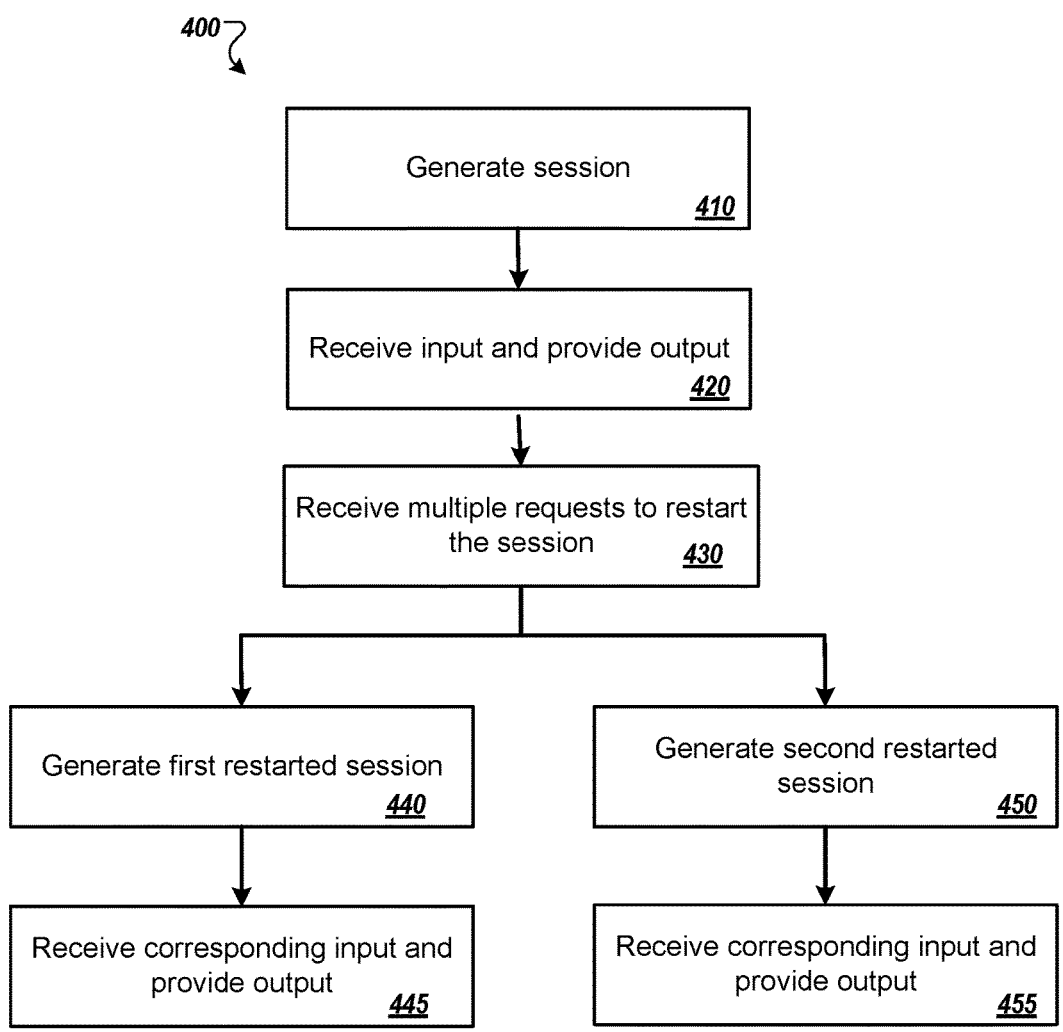
FIG. 4 is a flow diagram of an example process for collaborative debugging, according to certain aspects.

FIG. 4 is a flow diagram of an example process 400 for collaborative debugging. For convenience, the process 400 will be described as being performed by a system of one or more computers located in one or more locations. For example, a debugging system, e.g., the debugging system 150 of FIG. 1, appropriately programmed, can perform the process of 400. The process 400 for collaborative debugging describes a process of providing one or more restarted debugging sessions, and receiving application inputs at each of the restarted debugging sessions.

At step 410, the debugging system generates a debugging session that is executed at the debugging system. The debugging system can create the debugging session in a software container. The system can associate the debugging session with a unique identifier, such as a URL, upon generation of the debugging session. Specifically, the URL can be used to provide a link to the debugging session. For example, when accessed, the URL can establish a web socket connection to a web server of the debugging system. The web server can be used to create a debugging session, to be provided to the user who accessed the URL. As such, the debugging session can further be shared and accessed by multiple users via the unique identifier.

At step 420, the debugging system receives application inputs and generates outputs corresponding to the application inputs to be provided for presentation. The application inputs can be provided to the debugging system by one or more users. The debugging system can receive the application inputs as an input stream over a web socket connection. The debugging system can persistently store the application inputs via a database cluster. Further, the debugging system can provide the outputs for presentation to the users via a browser based application. In certain aspects, the debugging system can store the application inputs at a database cluster as they are received. By storing the application inputs corresponding to a particular debugging session, the debugging system can automatically achieve a previous state of the debugging session by resubmitting previously submitted application inputs. As such, the context of each debugging session can be referred to at a later point in time as the application inputs are resubmitted at the debugging system to generate the corresponding outputs of the debugging session.

At step 430, the debugging system receives multiple requests to restart the debugging session. The multiple requests to restart the debugging session can correspond to requests to fork the debugging session. As such, the requests can be provided to the debugging system to permit multiple users to modify a restarted debugging session that corresponds to the initial debugging session. In other words, the debugging system receives multiple requests from multiple users who wish to collaboratively debug an application. By receiving requests to restart the debugging session, the debugging system can further generate restarted sessions that maintain the context of an initial debugging session, and provide the restarted sessions for mutable purposes to the users. For example, in the instance where the ending application state of a debugging session is saved, the debugging session may be resumed by the debugging system at a later point in time. The debugging session can be resumed by restarting the session. The request to restart the debugging session can be received even if the initial debugging session has ended. As such, one or more users who did not initially create the debugging session, can access the debugging session after the initial user has killed the debugging session. In other words, the initial debugging session does not need to be maintained by the original user for other users to access the debugging session by the debugging system.

At step 440, the debugging system resubmits the application inputs corresponding to the debugging session at a web server layer to generate a first restarted session. In certain aspects, the debugging system resubmits the application inputs in response to receiving a first request to fork the debugging session. As such, the first request to fork the debugging session enables the first restarted session to be modified without changing the context of the initial debugging session or affecting other instances of the debugging session. The application inputs can be multiplexed by the debugging system at the web server to be provided to a first software container that corresponds to the first restarted session. The debugging system can generate outputs corresponding to the application inputs at the first software container and demultiplex the outputs back through the web server layer for presentation to a first user. The multiplexing of the application inputs and the demultiplexing of the corresponding outputs occurs when multiple users request access to multiple instances of an initial debugging session. However, in certain aspects, when multiple users request access to a single instance of the initial debugging session, the application inputs of the initial debugging session can be resubmitted to achieve the ending application state without necessarily multiplexing the application inputs.

In some aspects, the debugging system provides the output to the first user via a first browser. The application inputs can be resubmitted by the debugging system in response to receiving one or more requests to restart the debugging session from the first user via the first browser. The debugging system can resubmit the application inputs to replicate an ending application state of the debugging session. For example, multiple users can request access to the same debugging session via a single URL that is associated with the debugging session. If a first user requests access to the debugging session, then the debugging system can generate a first restarted session and provide the first restarted session for presentation to the first user.

At step 445, the debugging system receives outputs generated by the application as a result of the application inputs of the first restarted session and provides the output at the first software container for presentation during the first restarted session. As such, a single debugging session can be shared and modified by multiple users. For example, in the instance where the ending application state is forked to a first user, the first user can access a first restarted debugging session to provide additional application inputs that modify the initial debugging session. The additional application inputs can be stored via the debugging system at the database cluster. In doing so, the context of the first restarted session may be stored for future reference and modification. Thus, one or more users can modify the debugging session from the ending application state. As such, the debugging session can be mutable from the ending application state, without requiring the creator of the initial debugging session to reproduce the application inputs required to achieve the ending application state of the application.

At step 450, the debugging system resubmits the application inputs corresponding to the debugging session at the web server layer to generate a second restarted session. In certain aspects, the debugging system resubmits the application inputs in response to receiving a second request to fork the debugging session. As such, the second request to fork the debugging session enables the second restarted session to be modified without changing the context of the initial debugging session or the context of the first restarted session. The debugging system can multiplex the application inputs at the web server layer to be provided to a second software container that corresponds to the second restarted session. The debugging system can generate outputs corresponding to the application inputs at the second software container and demultiplex the outputs back through the web server layer for presentation to a second user. In some aspects, the debugging system provides the output to the second user via a second browser. The application inputs can be resubmitted in response to receiving one or more requests to restart the debugging session from the second user via the second browser. Further, the application inputs can be resubmitted by the debugging system to replicate an ending application state of the debugging session.

At step 455, the debugging system receives outputs generated by the application as a result of the application inputs that are received during the second restarted session and the output is provided at the second software container for presentation during the second restarted session. As such, a single debugging session can be shared and modified by multiple users. For example, in the instance where the ending application state is forked to a second user by the debugging system, the second user can access a second restarted debugging session to provide additional application inputs that modify the initial debugging session. The debugging system can store the additional application inputs via the database cluster. In doing so, the debugging system can store the context of the second restarted session for future reference and modification.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
  generating a session for an application executing on a remote debugging system;
  during the session, receiving one or more application inputs for the application from one or more remote users and providing outputs generated by the application for presentation to the one or more remote users;
  receiving a request to restart the session from a particular remote user;
  in response to receiving the request to restart the session, resubmitting the one or more application inputs to the application to replicate an ending application state for the session; and
  providing, for presentation to the particular remote user, a restarted session for the application starting from the ending application state.

2. The method of claim 1, wherein generating the session comprises:
  executing the application in a container that is managed by the remote debugging system.

3. The method of claim 1, further comprising:
associating a unique identifier with the session;
receiving a request from a remote user that includes the unique identifier; and
in response to receiving the request, providing the remote user access to the session.

4. The method of claim 1, further comprising:
storing state data defining the ending application state for the session; and
analyzing the state data for patterns using one or more machine learning systems.

5. The method of claim 1, further comprising:
receiving the one or more application inputs as an input stream over a web socket connection; and
providing the one or more outputs generated by the application as an output stream over the web socket connection.

6. The method of claim 1, wherein the restarted session for the application is a stream that allows the particular remote user to interact with a command line interface for the application.

7. The method of claim 1, further comprising:
during the restarted session, receiving one or more application inputs for the application from the particular remote user; and
providing, for presentation to the particular remote user, outputs generated by the application for presentation to the particular remote user.

8. The method of claim 1, wherein the application executing on the remote application session is a browser based application.

9. The method of claim 8, wherein the browser based application provides the particular remote user access to one or more of a debugging tool and an executable script.

10. The method of claim 1, further comprising:
receiving a plurality of requests to restart the session from multiple remote users;
in response to receiving the plurality of requests to restart the session, resubmitting the one or more application inputs to the application to replicate an ending application state for the session, wherein the plurality of requests are multiplexed at a web server layer; and
providing, for presentation to each of the multiple remote users, a restarted session for the application starting from the ending application state, wherein the restarted session is demultiplexed at the web server layer.

11. A system comprising:
one or more computers and one or more storage devices storing instructions that are operable, when executed by the one or more computers, to cause the one or more computers to perform operations comprising:
generating a session for an application executing on a remote debugging system;
during the session, receiving one or more application inputs for the application from one or more remote users and providing outputs generated by the application for presentation to the one or more remote users;
receiving a request to restart the session from a particular remote user;
in response to receiving the request to restart the session, resubmitting the one or more application inputs to the application to replicate an ending application state for the session; and
providing, for presentation to the particular remote user, a restarted session for the application starting from the ending application state.

12. The system of claim 11, wherein generating the session comprises:
executing the application in a container that is managed by the remote debugging system.

13. The system of claim 11, further comprising:
associating a unique identifier with the session;
receiving a request from a remote user that includes the unique identifier; and
in response to receiving the request, providing the remote user access to the session.

14. The system of claim 11, further comprising:
storing state data defining the ending application state for the session; and
analyzing the state data for patterns using one or more machine learning systems.

15. The system of claim 11, further comprising:
receiving a plurality of requests to restart the session from multiple remote users;
in response to receiving the plurality of requests to restart the session, resubmitting the one or more application inputs to the application to replicate an ending application state for the session, wherein the plurality of requests are multiplexed at a web server layer; and
providing, for presentation to each of the multiple remote users, a restarted session for the application starting from the ending application state, wherein the restarted session is demultiplexed at the web server layer.

16. A non-transitory computer-readable medium storing software comprising instructions executable by one or more computers which, upon such execution, cause the one or more computers to perform operations comprising:
generating a session for an application executing on a remote debugging system;
during the session, receiving one or more application inputs for the application from one or more remote users and providing outputs generated by the application for presentation to the one or more remote users;
receiving a request to restart the session from a particular remote user;
in response to receiving the request to restart the session, resubmitting the one or more application inputs to the application to replicate an ending application state for the session; and
providing, for presentation to the particular remote user, a restarted session for the application starting from the ending application state.

17. The computer-readable medium of claim 16, wherein generating the session comprises:
executing the application in a container that is managed by the remote debugging system.

18. The computer-readable medium of claim 16, further comprising: associating a unique identifier with the session;
receiving a request from a remote user that includes the unique identifier; and
in response to receiving the request, providing the remote user access to the session.

19. The computer-readable medium of claim 16, further comprising:
storing state data defining the ending application state for the session; and
analyzing the state data for patterns using one or more machine learning systems.

20. The computer-readable medium of claim 16, further comprising:
receiving a plurality of requests to restart the session from multiple remote users;

in response to receiving the plurality of requests to restart the session, resubmitting the one or more application inputs to the application to replicate an ending application state for the session, wherein the plurality of requests are multiplexed at a web server layer; and providing, for presentation to each of the multiple remote users, a restarted session for the application starting from the ending application state, wherein the restarted session is demultiplexed at the web server layer.

* * * * *